Oct. 7, 1969 — S. M. BODOLAY ET AL — 3,471,000

PRE-PACKAGING MECHANISM

Filed Feb. 9, 1968 — 2 Sheets-Sheet 1

Stephen M. Bodolay
William A. Bodolay
INVENTORS.

Oct. 7, 1969 S. M. BODOLAY ET AL 3,471,000
PRE-PACKAGING MECHANISM
Filed Feb. 9, 1968 2 Sheets-Sheet 2
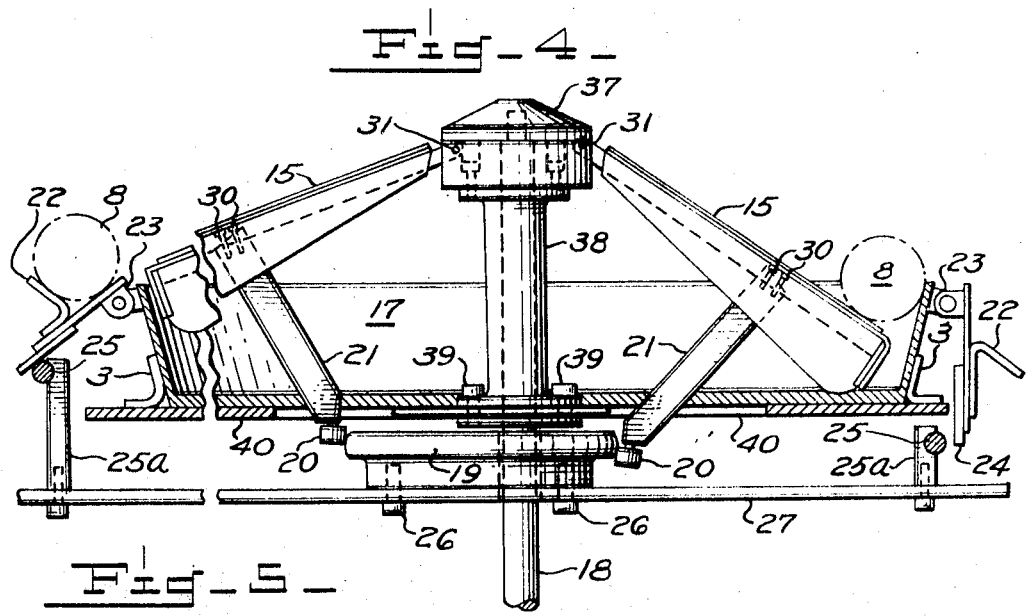
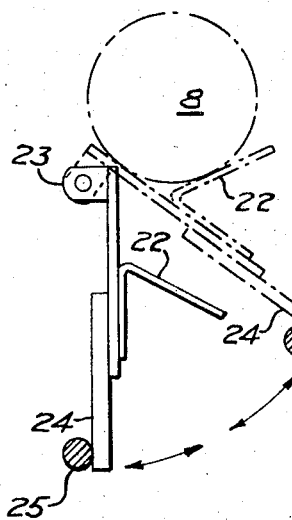
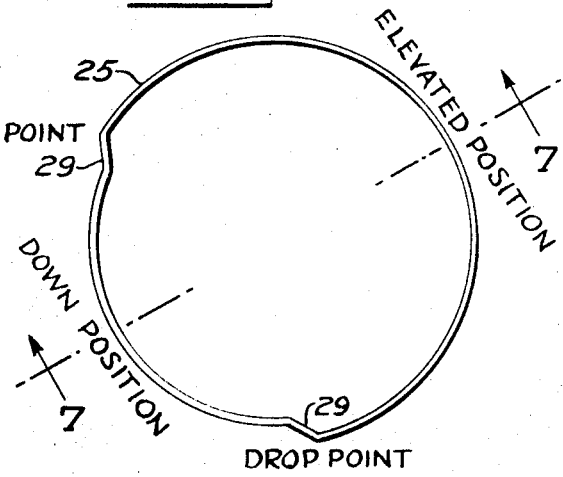
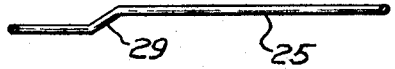
Stephen M. Bodolay
William A. Bodolay
INVENTORS.
BY J. S. Michelman
Atty.

3,471,000
PRE-PACKAGING MECHANISM
Stephen M. Bodolay, 15 Daviston St. 01108, and William A. Bodolay, 54 Shady Brook Lane 01118, both of Springfield, Mass.
Filed Feb. 9, 1968, Ser. No. 704,312
Int. Cl. B65g 37/00, 47/44
U.S. Cl. 198—105     10 Claims

ABSTRACT OF THE DISCLOSURE

This invention is concerned with a mechanism for orienting and feeding fruit and produce to a particular location for the purpose of packaging the said fruit in a delicate manner. The equipment for performing this function comprises of a conveyor for bringing the fruit onto the radially disposed arms of a rotating mechanism. The mechanism consists of a plurality of extending radial segments or arms which arms operate up and down in a vertical plane lowering and raising as they pass a particular station during a cycle of rotation. At a certain point in the cycle of rotation, the radial arms raise up so as to place delicately an item of fruit on a shelf that is in tilted position. When the shelf, which rotates simultaneously with the radial arms, reaches a particular station, the tilt angle of the shelf is changed and the fruit rolls gently into a chute or outlet. This cycle is continuous during rotary motion of the mechanism.

---

This invention is concerned with a mechanism for the automatic orientation and distribution of fruit and produce preliminary to packaging at high speed.

Attempts have been made to distribute, orient, and convey fruit and produce for the purpose of packaging same. Most of the equipment that has been designed has been lacking in many ways. One of the problems is that the existing mechanisms cause the fruit to become bruised, crushed and damaged in the desire to package the fruit at high speed.

It is therefore an object of the within invention not only to distribute fruit and produce to a station for prepackaging at high speed, but also to provide a mechanism so designed that the fruit will not be bruised, crushed or injured as it is moved from its source to the packaging station.

It is another object of the within invention to provide a mechanism that is simple in the cost of manufacture and easy to maintain.

It is still another object of the within invention to provide a mechanism for distributing fruit to a packaging station that is compact in size and easily maneuverable so that it may be used with various packaging machines.

It is still an additional object of the within invention to provide an automatic orientation and distribution mechanism for fruit and produce that will not be hampered by the size of the fruit or produce, but will work efficiently both for items such as grapefruits as well as lemons.

It is still an object of this invention to provide an automatic distribution and orientation-type of mechanism for fruits, vegetables and the like that is adaptable both for the type of fruit, vegetables and the like that are counted and sold by the dozen, as well as for those that are usually sold by weight.

It is yet a further object of the within invention to provide a distribution and orientation device for fruit and the like which is sanitary in that no human hands are required to touch the fruit, vegetables or the like once they have been washed and placed on the conveyor for distribution to the mechanism.

It is an additional object of the within invention to provide an automatic mechanism for orienting and distributing fruit, vegetables and the like that eliminates the handling of the items by expensive labor in order to maintain the handling costs at a minimum.

These and other objects are obtained by a mechanism that operates in a rotary motion. The mechanism has a center shaft that is mounted in a vertical plane. Extending outwardly from the center shaft radially in a horizontal plane, are a plurality of radial arms or segments. These segments rotate, but move up and down in a vertical plane. The segments are pre-controlled by a mechanism so that when they are at a particular location in the rotation cycle of the mechanism, they drop down, then pick up the fruit, and raise back up and place the fruit on a shelf that is tilted in such a way as to take advantage of gravity. The shelf rotates simultaneously with the radial segments. The radial segment will return to its original position to pick up more fruit once it has disposed of the particular fruit that it has previously picked up. Meanwhile, the fruit remains on the shelf that is at the periphery of the radial segments. At a particular location, opposite a chute or packaging station, the shelf tilts by a control mechanism so that the fruit gently rolls off into the packaging station. It is to be noted that the entire operation is done with gentleness and with speed.

For a more detailed description of the invention, reference is made to the following detailed specification, in which:

FIGURE 4 is a view in diagrammatic cross-section of the radial segment portion and feeding bowl of the device.

FIGURE 5 is a side elevation view of the shelf assembly showing diagrammatically the various positions of the shelf before having the fruit disposed thereupon and after the said fruit has been released.

FIGURE 6 is a top elevational view of the supporting cam for the shelf assembly of FIGURE 5, indicating the area along its periphery wherein the fruit is released from the shelf assembly.

FIGURE 7 is a side elevational view of the supporting cam of FIGURE 6.

Figure 1:
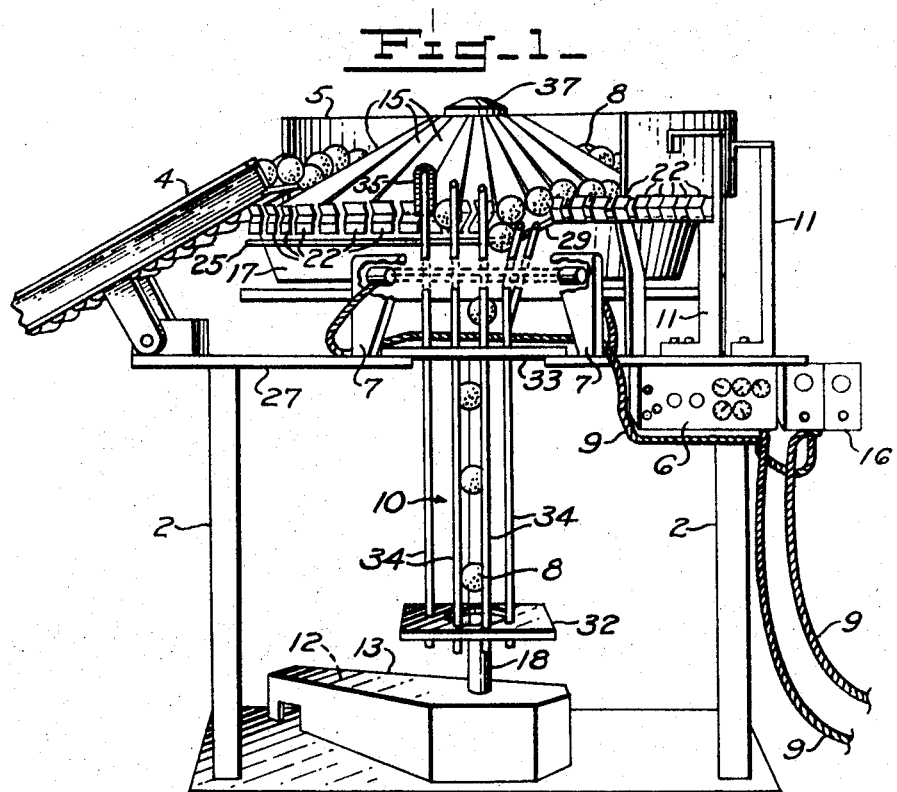
FIGURE 1 is a front elevational view of the mechanism.

The mechanism is supported in the embodiment disclosed on four vertical legs 2 which have mounted on the bottom thereof, casters 14. There is a bottom shelf 1 of the sheet type connecting the legs. The original embodiment has been made of steel legs and sheets of steel. The motor and chain drive 12 are concealed by the cover shield 13. Connected to the drive 12 within the shield 13 is the shaft 18 which is hereinafter referred to as the spindle 18. The spindle 18 is a solid steel shaft that extends from the mounting within the cover 13 to the top or hub 37 of the machine.

Figures 2, 3:
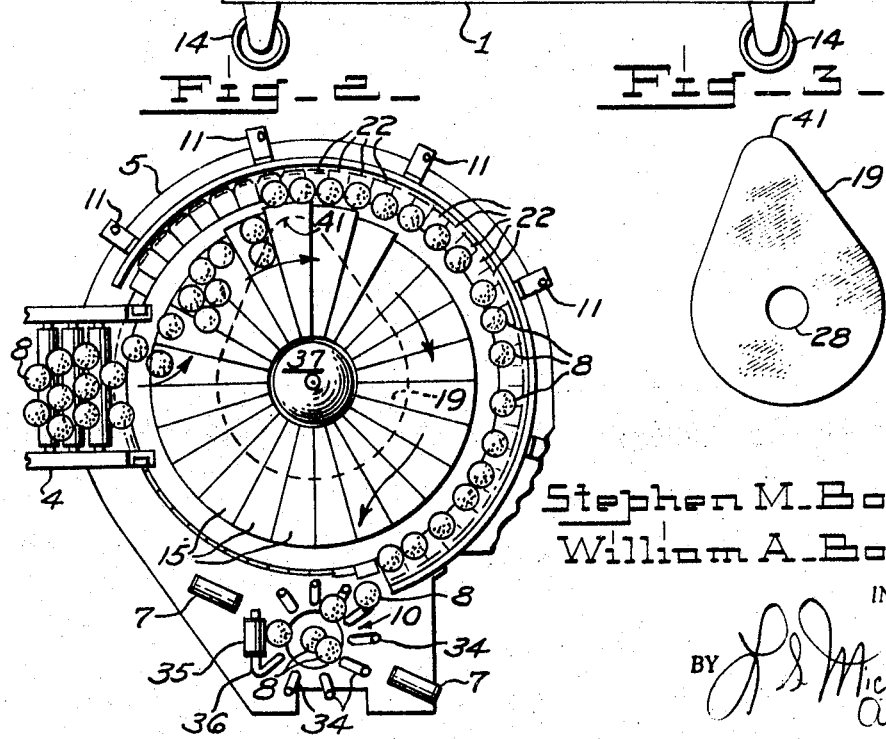
FIGURE 2 is a top plan view of the view of FIGURE 1, without the chassis mechanism.
FIGURE 3 is a top plan view of the radial segment operating cam.

As can be seen from the top view of FIGURE 2, the chute assembly 10 for the fruit 8 is located forward of the spindle 18. In viewing FIGURE 1, it appears that the guide bars 34 which control the discharge of the fruit surround the spindle 18. However, by reference to the view of FIGURE 2, it can be seen that the fruit chute assembly comprising of the various bars 34, is located forward of the transmission spindle 18, and do not surround spindle 18.

Reference is made to the top view of the radial segments 15 in FIGURE 2. The periphery 5 appears at ends of the radial segments 15. The periphery 5 is referred to as the guard 5. Within the guard 5, particularly in the view of FIGURE 2, is the nomenclature which is the basis for this invention.

A conveyor 4 is indicated in the view of FIGURE 2 at the left side thereof, as well as in the view of FIGURE 1. It can be seen that the conveyor 4 is mounted on a shelf which is supported by the leg 2. The conveyor 4 is at an incline to raise the fruit 8 from the supply source. The fruit 8 is placed by the conveyor 4 upon a plurality of radial segments 15 which extend out from the hub 37.

In the embodiment shown, there are 24 radial segments 15. It has been determined for the more popular types of fruit such as oranges and apples that 24 radial segments 15 work most efficiently. However, if the machine were to be designed for plums or other smaller fruit, it is within the realm and spirit of this invention to increase the number of radial segments 15 to as many as 48. It is therefore to be stated in this specification that the number of radial segments 15 will not depart from the scope of this invention, but within the contemplation hereof.

Reference is made to the view of FIGURE 4 which shows the details of construction of the radial segments 15. The radial segments 15 are flat and are truncated triangular pie-shaped members. Each radial segment 15 is controlled by the rotary feed elevating cam arm 21 for movement up and down as it rotates. The cam arm 21 connects to a pair of elevated cam screws 30 which are located below the surface of the radial arms 15. The other end of the rotary feed elevating cam arm 21 is connected to cam 19 by means of the cam rollers 20. In the view of FIGURE 4, there are two typical separate radial segments 15 shown. Since it has already been stated that there are 24 in this particular embodiment of the invention, it may be stated that there are 24 radial cam arms 21 similar to and connected in the same manner as those shown in FIGURE 4. Cam 19 is shown in FIGURE 3 in a top plan view and the configuration as shown in FIGURE 3 indicates that the cam 19 is substantially semi-circular on one side and then protrudes in a somewhat elliptical manner on the other side. Cam 19 has a substantially large hole 28 to permit the spindle 18 to move therethrough without interfering with cam 19. Cam 19 is mounted in a fixed position by the cam bolts 26, maintaining cam 19 secure with the cam plate 27.

The canopy or hub 37 covers a housing 38 which circumscribes and shields the spindle 18. At the bottom of the housing 38 are a pair of bolts 39 which secure a disc-shaped member 40 to the housing 38. The assembly comprising 37, 38, 39 and 40, rotate with the spindle 18 as the result of the hub 37 being mounted at the top of the spindle 18.

The disc 40 acts as a guard for the radial segments 15 in that they rest thereupon when they are in their lower position, preventing lateral movement of the radial segments 15 so that they will not cause damage to the fruit, as well as becoming tangled with one another so as to prevent their upward and downward movement as they are controlled by their position on the cam 28.

In the view of FIGURE 1 there is a box 6 which houses an electronic counter mechanism for counting the number of pieces of fruit that are placed into the chute 10. Connected to the mechanism within the box 6 are power lines 9 for carrying the electrical source. The mechanism for controlling the speed of the motor is located at 16. The motor is of the variable speed type and is therefore controlled by the mechanism located at 16 which is or may be, as in this embodiment, a Variac. Oranges 8 are specifically shown in this embodiment.

There are a pair of electric photocells 7 which scan across the top of the chute 10. Each time that a piece of fruit 8 passes between this scanning device, the circuit is broken and the counting device located in the housing 6 is actuated.

The guard 5 is supported by brackets 11 which are mounted on the cam plate 27. As stated, the guard 5 is located at the outer periphery of the radial segments 15. The guard 5 prevents the fruit 8 from rolling from the top surface of the radial segments 15. A tilted collar 17 acts as a container for the fruit when the radial segments 15 are in their lowest position. Rotary pan collar 17 is mounted on the radial segment support disc member 40 by means of L-shaped brackets 3. As previously stated, the rotary feed elevating cam arm 21 connects the radial segments 15 with the cam 19 by means of the roller bearings 20. This can be seen clearly in the view of FIGURE 4.

At the outer periphery of the mechanism as can be seen in the view of FIGURE 2 and FIGURE 4 in detail, are located the rotary feed pocket units 22 which are referred to as a shelf. This shelf 22 is supported on a hinge mechanism 23, which pivots in the direction of the arrows. There is a nylon shoe which extends outwardly from the shelf 22 comprising of the hinge 23 and the rotary feed pocket unit 22.

Cam 25 which is shown in the top view of FIGURE 6 has a circular cross-section that has the shape as shown and can be seen in cross-section as 25 in the view of FIGURE 5, as well as in the view of FIGURE 4. The beaded cam 25 is supported by the member 25a which is connected by a bolt to the cam plate 27.

In FIGURE 5 the location of the nylon shoe 24 is shown both when the orange 8 is being held awaiting delivery to the chute (in dotted lines) and when it is in an inoperative position after the orange 8 has been delivered to the chute. It is to be noted that when the orange 8 has been released, the nylon shoe 24 is in a vertical position and that when the orange 8 is being held awaiting its eventual departure, the nylon shoe 24 is in contact with the cam 25 so that it is approximately 30° downwardly from the horizontal. It is further to be pointed out that the view of FIGURE 7 shows the departure from the horizontal of the cam 25 at the bend 29. Consequently, when the nylon member 24 is in a vertical position, it is in contact with the cam 25 at the area on the left portion of cam 25 (FIGURE 6) between the points 29 and it is at its 30° below the horizontal position at the points along the cam on the other side of the points from 29. (See FIGURE 6.)

Reference has been made to the chute 10 (area within the bars 34) wherein the oranges or fruit 8 are discharged after first coming off the conveyor 4 and after being distributed and oriented along the radial segments 15. The chute assembly 10 comprises of a chute lower plate 32 which can be seen clearly in the view of FIGURE 1. Mounted on the lower plate 32 are the guard bars 34 which are circular tubular members. Chute 10 is the area confined within the guards or bars 34. The guards or bars 34 are connected to the upper plate 33. The upper plate 33 is connected permanently to the cam plate 27. At the top of the chute 10 is located a bumper guard 35 which prevents the fruit or oranges 8 from rolling past the location at the top of the chute 10. Bumper guard 35 is mounted at the top of a guard bar 34 indicated by the numeral 36 in the view of FIGURE 2.

In operation, the fruit or oranges 8 are delivered separately to the rotary pan 17 by the conveyor 4. The oranges are disbursed as shown in the view of FIGURE 1 in the pan 17, atop the radial segments 15. As the radial segments rotate clockwise within the pan 17, the oranges 8 rotate with the segment 15 which is beneath them to a point designated by 41 in the view of FIGURE 2 which is at the tip of cam 19 as shown in the view of FIGURE 3. The radial segments 15 at 41 have completed their elevated motion as shown in the view of FIGURE 4. At this point the orange now rolls off of the radial segments onto the elevated position shown in the view of FIGURE 5 being maintained stationary in its elevated position, but still rotating. At this moment when an orange 8 has been placed up against the guard 22, the orange 8 immediately behind it, having no place to go, will roll back into the pan 17 and remain on the surface of a radial segment and will later be placed upon the guard 22 in the next rotation above the cam. This elevation of the segments 15 orients the oranges 8 so that they are now mounted in a single line on the guard 22 and can easily be controlled, distributed and counted. At the chute 10, the orange 8 which is mounted as shown in the view of FIGURE 5, will now be released by the cam action 25. When the nylon member 24 reaches the points between 29 (left side) on the cam 25, guard 22 will drop to a vertical position permitting the orange 8 to roll into the chute 10 in a gentle manner. Since there is no crowding or disrupting of the oranges 8, and since they are now in a line oriented properly, the bruising, damage and crushing of the fruit is eliminated.

We claim:

1. A mechanism for feeding fruit and/or produce to a packaging station, comprising a plurality of radially disposed arms, a canopy assembly, said arms connected to said canopy assembly, means for placing fruit upon the surfaces of said arms, means for elevating said arms, means for moving said arms about their common radial point, to wit: the canopy assembly, in a circular path so as to continuously rotate thereabout, means for supporting said fruit after said arms are elevated, means for lowering said arms after said fruit is supported, and means for placing said fruit into the packaging station.

2. A mechanism as described in claim 1 wherein said means for elevating said arms comprises a fixed cam having a high point and causing said radial arms to raise upwardly as they pass thereover.

3. A mechanism as described in claim 1 wherein said means for moving said arms in a circular path comprises a vertical shaft, a transmission system connected to said shaft and causing said shaft to rotate, said canopy assembly located at the center of said radially disposed arms, said shaft being connected to said canopy assembly and causing said assembly and said radially disposed arms to rotate.

4. A mechanism as described in claim 1 wherein said means for supporting said fruit comprises a shelf and hinged guard, said shelf being connected to the canopy assembly and rotating simultaneously with the said arms, a fixed beaded cam beneath said guard, and causing said guard to drop down on its hinge releasing the fruit at the packaging station and causing said guard to return to its support position.

5. A mechanism as described in claim 2 wherein said means for moving said arms in a circular path comprises a vertical shaft, a transmission system connected to said shaft and causing said shaft to rotate, said canopy assembly located at the center of said radially disposed arms, said shaft being connected to said canopy assembly and causing said assembly and said radially disposed arms to rotate.

6. A mechanism as described in claim 2 wherein said means for supporting said fruit comprises a shelf and hinged guard, said shelf being connected to the canopy assembly and rotating simultaneously with the said arms, a fixed beaded cam beneath said guard, and causing said guard to drop down on its hinge releasing the fruit at the packaging station and causing said guard to return to its support position.

7. A mechanism as described in claim 3 wherein said means for supporting said fruit comprises a shelf and hinged guard, said shelf being connected to the canopy assembly and rotating simultaneously with the said arms, a fixed beaded cam beneath said guard, and causing said guard to drop down on its hinge releasing the fruit at the packaging station and causing said guard to return to its support position.

8. A mechanism as described in claim 1 including a means for counting the fruit prior to its being placed into the packaging station.

9. A mechanism as described in claim 2 including a means for counting the fruit prior to its being placed into the packaging station.

10. A mechanism as described in claim 3 including a means for counting the fruit prior to its being placed into the packaging station.

References Cited

UNITED STATES PATENTS

| 2,821,157 | 1/1958 | Boyd | 198—209 X |
| 3,175,702 | 3/1965 | Banyas | 198—25 X |

GERALD M. FORLENZA, Primary Examiner

G. F. ABRAHAM, Assistant Examiner

U.S. Cl. X.R.

198—30, 158, 209